(12) United States Patent
Kilgard et al.

(10) Patent No.: US 7,528,843 B1
(45) Date of Patent: May 5, 2009

(54) DYNAMIC TEXTURE FETCH CANCELLATION

(75) Inventors: Mark J. Kilgard, Austin, TX (US); Rui M. Bastos, Porto Alerge (BR); Johnny S. Rhoades, Durham, NC (US); Cass W. Everitt, Round Rock, TX (US); Wei-Chao Chen, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 613 days.

(21) Appl. No.: 11/203,550

(22) Filed: Aug. 12, 2005

Related U.S. Application Data

(60) Provisional application No. 60/705,901, filed on Aug. 5, 2005.

(51) Int. Cl.
*G09G 5/00* (2006.01)
*G06T 15/40* (2006.01)
*G06T 11/40* (2006.01)
*G06F 9/44* (2006.01)
*G06F 9/45* (2006.01)

(52) U.S. Cl. ............... 345/582; 345/421; 345/426; 345/428; 345/552; 345/563; 717/106; 717/124; 717/140; 717/145

(58) Field of Classification Search ............. 345/563, 345/582, 552, 428, 421, 426; 717/106, 124–126, 717/140, 145–148
See application file for complete search history.

(56) References Cited

U.S. PATENT DOCUMENTS

| 6,333,746 | B1 | 12/2001 | Vaswani et al. |
| 6,427,234 | B1* | 7/2002 | Chambers et al. ........... 717/140 |
| 6,501,482 | B1 | 12/2002 | Rosman et al. |
| 6,724,394 | B1* | 4/2004 | Zatz et al. .................. 345/581 |
| 2003/0095134 | A1 | 5/2003 | Tuomi et al. |

FOREIGN PATENT DOCUMENTS

EP 1489560 A1 12/2004

* cited by examiner

*Primary Examiner*—Xiao M Wu
*Assistant Examiner*—Tize Ma
(74) *Attorney, Agent, or Firm*—Patterson & Sheridan, LLP

(57) ABSTRACT

Systems and methods for dynamically canceling texture fetches may improve texture mapping performance. A shader program compiler inserts condition code writes and condition code comparison operations for shader program instructions that contribute to a texture read instruction and do not need to be executed if certain conditions are met. During execution of the shader program, the inserted condition codes are used to compute a dynamic writemask that indicates if the texture data resulting from the texture read is unnecessary. The dynamic writemask is used to cancel unnecessary texture fetches during execution of the shader program.

16 Claims, 8 Drawing Sheets

DYNAMIC TEXTURE FETCH CANCELLATION

CROSS-REFERENCE TO RELATED APPLICATION(S)

This application claims priority from provisional U.S. Patent Application No. 60/705,901 titled "DYNAMIC TEXTURE FETCH CANCELLATION," filed Aug. 5, 2005, which is incorporated by reference as though fully set forth herein.

BACKGROUND OF THE INVENTION

1. Field of the Invention

Embodiments of the present invention generally relate to computer graphics, and more particularly to reading texture map data.

2. Description of the Related Art

Conventional graphics processors are exemplified by systems and methods developed to read data stored in texture maps, commonly referred to as texels. Conventionally, texture maps are stored in a graphics memory device and texels read from a texture map are returned to the graphics processor after several clock cycles. Graphics processing may stall and not continue processing data while waiting for the texels. Alternatively, a buffer may be dedicated to storing processed data that requires the texels for further processing. The size of the buffer should correspond to the maximum texture map read latency in order to avoid stalling the processing. Since the texture read latency may be non-deterministic, the buffer size may need to be quite large.

The graphics memory device that stores the texture maps is typically also used to store frame buffer data, including one or more display buffers. The bandwidth between the graphics memory device and the graphics processor is used to access texture maps and frame buffer data. Sometimes graphics processing performance is limited by the bandwidth available between the graphics memory device and the graphics processor.

Accordingly, there is a need to minimize unnecessary texture fetches of texels that do not contribute to the final shaded pixel value in order to improve graphics processing performance.

SUMMARY OF THE INVENTION

The current invention involves new systems and methods for dynamically canceling unnecessary texture fetches. A shader program compiler inserts condition code writes and condition code comparison operations for shader program instructions that contribute to a texture read instruction and do not need to be executed if certain conditions are met. During execution of the shader program, the inserted condition codes (compiler inserts condition code writes and condition code comparison operations) are used to compute a dynamic writemask that indicates if the texture data resulting from the texture read will not contribute for the final pixel value and are therefore unnecessary. The dynamic writemask is used to cancel unnecessary texture fetches during execution of the shader program.

Various embodiments of a method of the invention for dynamically canceling execution of an unnecessary operation specified by a program instruction include determining that a condition code comparison operation is specified by the program instruction, obtaining condition code values for data being processed by the program instruction, applying the condition code comparison operation to the condition code values to produce a condition code result, and combining the condition code result with a writemask to produce a dynamic writemask indicating whether or not the operation specified by a program instruction is unnecessary and should be canceled.

Various embodiments of a method of the invention include a computer-readable medium containing a program which, when executed by a computing device, performs a process for inserting condition code comparison operations to produce a revised shader program. The process includes determining that a program instruction is cancelable and modifying the program instruction to specify a condition code comparison operation to produce condition code results when the program is executed, wherein the condition code results used to determine whether or not the program instruction should be dynamically cancelled during execution of the revised shader program.

Various embodiments of the invention include a computing device including a memory and a processor. The processor configured to execute a program and dynamically cancel unnecessary operations during execution of the program, wherein the processor includes a dynamic writemask unit. The dynamic writemask unit is configured to determine whether or not an operation specified by a program instruction should be dynamically canceled based on a condition code result that is produced by applying a condition code comparison operation specified by the program instruction to condition code values of a vertex or a fragment being processed by the program instruction.

Various embodiments of the invention include a system for performing graphics data processing. The system includes a graphics driver and a graphics processor. The graphics processor is configured to execute a program and dynamically cancel unnecessary operations during execution of the program.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Canceling unnecessary texture fetches may improve graphics processing performance, reduce power consumption, and reduce the amount of bandwidth needed between a graphics processor and memory device storing texture data. A texture read is unnecessary if the texture data will not contribute to the final shaded fragment value. For example, a texture read is unnecessary when the texture data will be scaled by zero. Texture data may include, but is not limited to, color, alpha, intensity, depth, shadow information, displacements, offsets, indices, stencils, or other values. During execution of a shading program one or more values may be computed as zero and texture fetches to read texels that are scaled by those values are unnecessary and should be dynamically cancelled to avoid potentially stalling processing and minimize texture read bandwidth usage. Furthermore, the systems and methods used to dynamically cancel texture fetches may also be used to dynamically cancel execution of other operations specified by program instructions, possibly improving processing performance by increasing instruction execution throughput and further minimizing computation and/or bandwidth usage.

Figure 1:
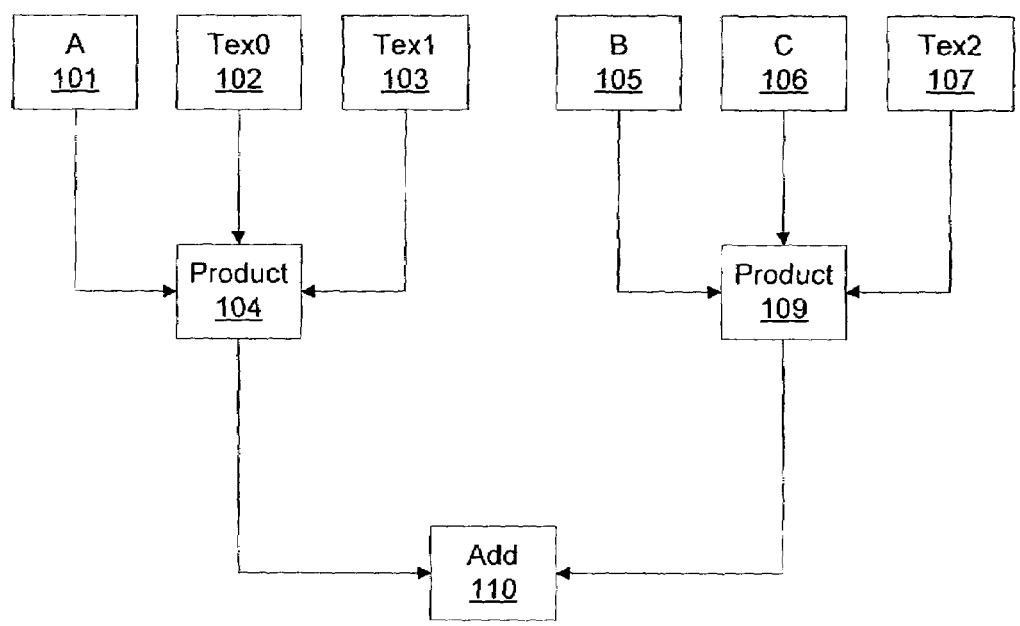
FIG. 1 illustrates an example of a shader program computation in accordance with one or more aspects of the present invention.

FIG. 1 illustrates an example of a shader program computation in accordance with one or more aspects of the present invention. Three inputs, a computed value or constant, A 101, and texels from two texture map lookups, Tex0 102 and Tex1 103, are multiplied together to produce a first product, product 104. When A 101 is zero, neither Tex0 102 nor Tex1 103 should be fetched. When Tex0 102 is zero, Tex1 103 should not be fetched. Similarly, when Tex1 103 is zero, Tex0 102 should not be fetched. Three other inputs, two computed values or constants, B 105 and C 106, and a texel from a texture map lookup, Tex2 107, are multiplied together to produce a second product, product 109. When either B 105 or C 106 is zero, Tex2 107 should not be fetched. Condition codes may be evaluated and used to determine a dynamic write mask for each component computed by an instruction. When the dynamic write mask indicates that an operation is not needed for a computation, for example when a texel will be multiplied by zero, the operation is cancelled, as described in conjunction with FIG. 4.

Figure 2:
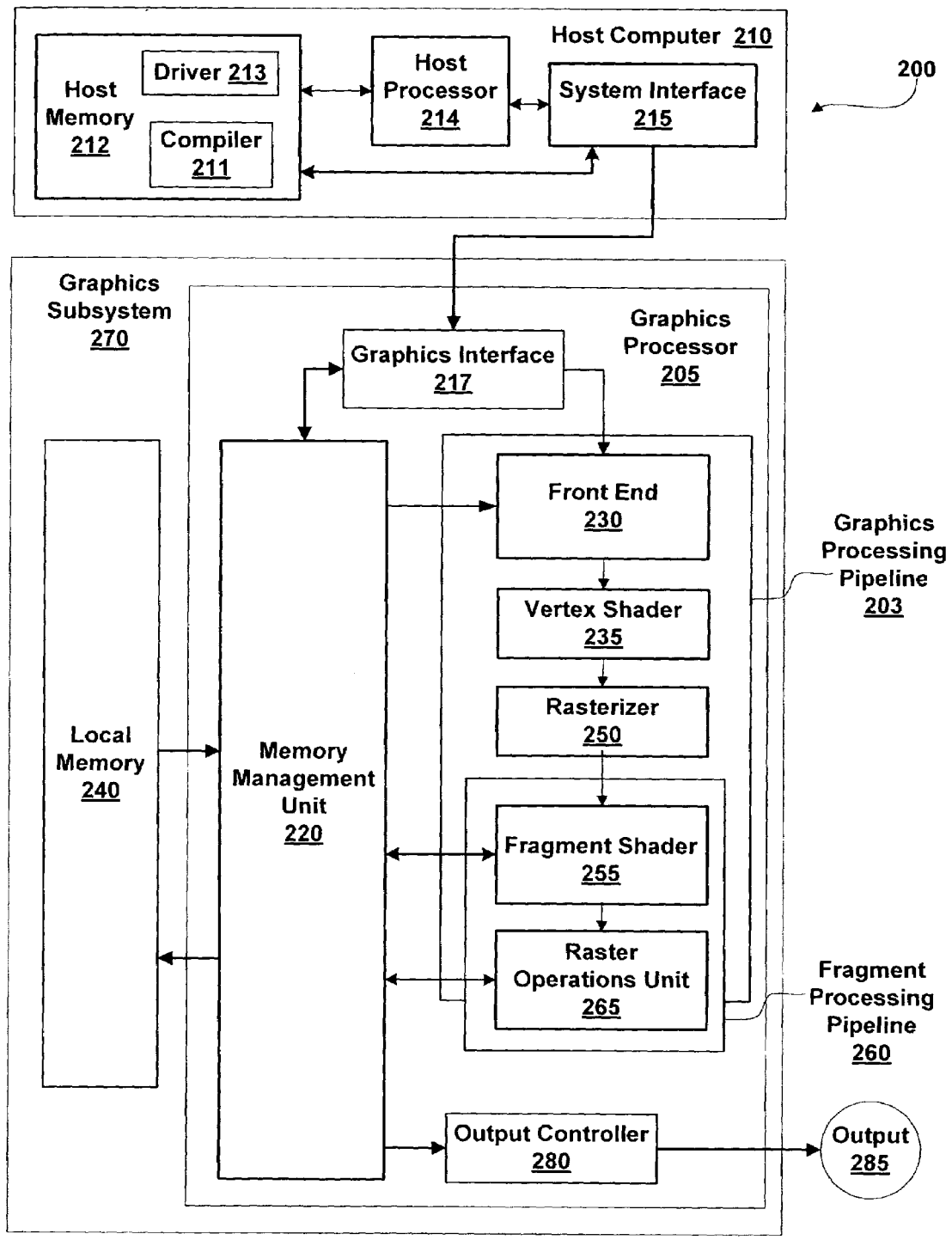
FIG. 2 is a block diagram of an exemplary embodiment of a respective computer system, including a host computer and a graphics subsystem, in accordance with one or more aspects of the present invention.

FIG. 2 is a block diagram of an exemplary embodiment of a respective computer system, including a host computer 210 and a graphics subsystem 270, in accordance with one or more aspects of the present invention. Computing system 200 may be a desktop computer, server, laptop computer, palm-sized computer, tablet computer, game console, portable wireless terminal such as a PDA or cellular telephone, computer-based simulator, or the like. Host computer 210 includes host processor 214 that may include a system memory controller to interface directly to host memory 212 or may communicate with host memory 212 through a system interface 215. System interface 215 may be an I/O (input/output) interface or a bridge device including the system memory controller to interface directly to host memory 212. An example of system interface 215 known in the art includes Intel® Northbridge.

Figure 5:
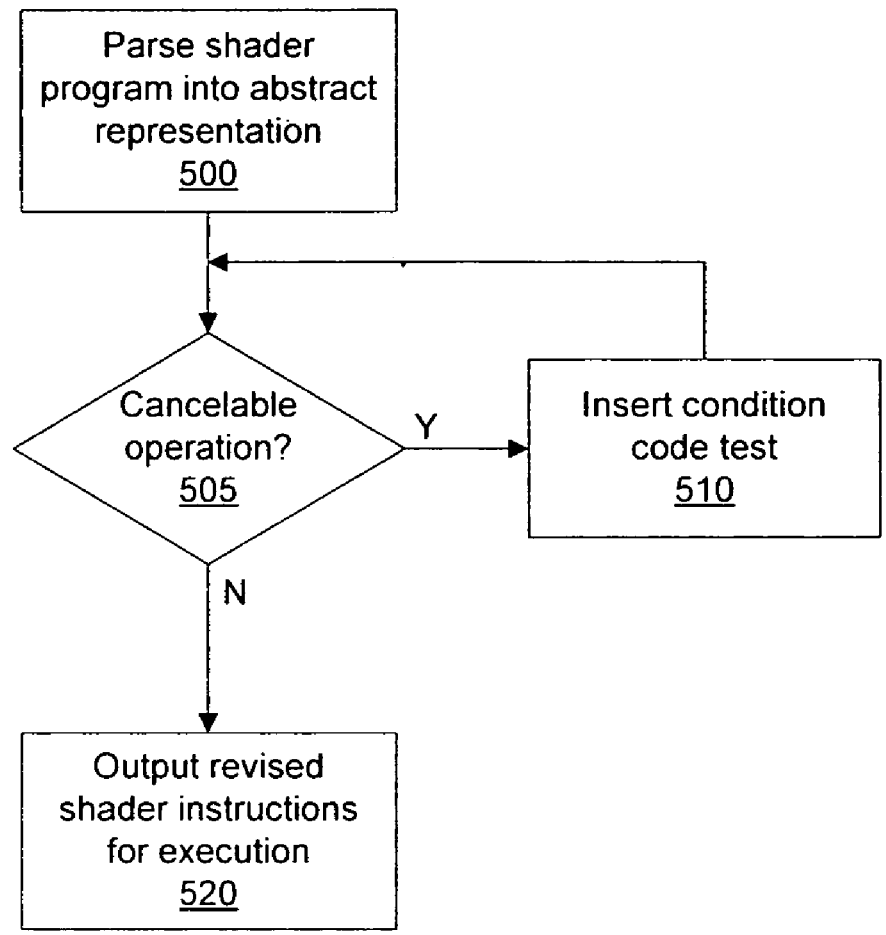
FIG. 5 illustrates an embodiment of a method for revising a shader program to dynamically cancel texture fetches during execution in accordance with one or more aspects of the present invention.

A graphics application compiler, compiler 211, compiles a shader program and optionally modifies the shader program, as described in conjunction with FIG. 5, selectively inserting condition code tests so that unnecessary texture fetches will be dynamically canceled when the shader program is executed. Compiler 211 produces shader program instructions for execution by a programmable graphics processor 205. A graphics device driver, driver 213, interfaces between processes executed by host processor 214, such as application programs, and a programmable graphics processor 205, translating program instructions generated by compiler 211 as needed for execution by programmable graphics processor 205. Driver 213 also uses commands to configure sub-units within programmable graphics processor 205.

In one embodiment of the present invention, a computer-readable medium stores program instructions for causing a computing device to insert condition code comparison operations to produce a revised shader program by determining that a program instruction is cancelable, and modifying the program instruction to specify a condition code comparison operation to produce condition code results when the program is executed, where the condition code results are used to determine whether or not the program instruction should be dynamically cancelled during execution of the revised shader program by a computing device.

Graphics subsystem 270 includes a local memory 240 and programmable graphics processor 205. Host computer 210 communicates with graphics subsystem 270 via system interface 215 and a graphics interface 217 within programmable graphics processor 205. Data, program instructions, and commands received at graphics interface 217 can be passed to a graphics processing pipeline 203 or written to a local memory 240 through memory management unit 220. Programmable graphics processor 205 uses memory to store graphics data, including texture maps, and program instructions, where graphics data is any data that is input to or output from computation units within programmable graphics processor 205. Each texture map stored in graphics memory corresponds to a particular texture map, i.e., texture identifier. Graphics memory is any memory used to store graphics data or program instructions to be executed by programmable graphics processor 205. Graphics memory can include portions of host memory 212, local memory 240 directly coupled to programmable graphics processor 205, storage resources coupled to the computation units within programmable graphics processor 205, and the like. Storage resources can include register files, caches, FIFOs (first in first out memories), and the like.

In addition to Interface 217, programmable graphics processor 205 includes a graphics processing pipeline 203, a memory management unit 220 and an output controller 280. Data and program instructions received at interface 217 can be passed to a front end 230 within graphics processing pipeline 203 or written to local memory 240 through memory management unit 220. In addition to communicating with local memory 240, and interface 217, memory management unit 220 also communicates with graphics processing pipeline 203 and output controller 280 through read and write interfaces in graphics processing pipeline 203 and a read interface in output controller 280.

Within graphics processing pipeline 203, front end 230 and a programmable graphics fragment processing pipeline, fragment processing pipeline 260, perform a variety of computational functions. Some of these functions are table lookup, scalar and vector addition, multiplication, division, coordinate-system mapping, calculation of vector normals, tessellation, calculation of derivatives, interpolation, filtering, and the like. Front end 230 and fragment processing pipeline 260 are optionally configured such that data processing operations are performed in multiple passes through graphics processing pipeline 203 or in multiple passes through fragment processing pipeline 260. Each pass through programmable graphics processor 205, graphics processing pipeline 203 or fragment processing pipeline 260 concludes with optional processing by a raster operations unit 265.

Vertex programs are sequences of vertex program instructions compiled by host processor 214 for execution within front end 230 and rasterizer 250. Shader programs are sequences of shader program instructions, compiled by compiler 211, for execution. Shader programs may include fragment shader program instructions that are executed within fragment processing pipeline 260 to process fragment data and/or vertex shader program instructions that are executed within vertex shader 235 to process vertex data. Texture fetches may be included in a shader program to process fragment data or to process vertex data. At the time the shader program is compiled it is usually not possible to determine that a texture fetch may be cancelled, however it is possible to identify operations specified by program instructions that may cause a texture fetch to become unnecessary. For example, a texture fetch becomes unnecessary when it will be multiplied by a value that during execution of the shader program is computed to be zero. Therefore, compiler 211 modifies the shader program and when the shader program is executed by programmable graphics processor 205, unnecessary texture fetches are dynamically cancelled, as described in conjunction with FIG. 4.

Front end 230 receives a stream of program instructions (vertex program instructions and shader program instructions) and data from interface 217 or memory management unit 220, and performs vector floating-point operations or other processing operations using the data. The program instructions configure subunits within front end 230, vertex shader 235, rasterizer 250, and fragment processing pipeline 260. The program instructions and data are stored in graphics memory, e.g., portions of host memory 212, local memory 240, or storage resources within programmable graphics processor 205. When a portion of host memory 212 is used to store program instructions and data, the portion of host memory 212 can be uncached so as to increase performance of access by programmable graphics processor 205. Alternatively, configuration information is written to registers within front end 230, vertex shader 235, rasterizer 250, and fragment processing pipeline 260 using program instructions, encoded with the data, or the like.

Data processed by front end 230 and program instructions are passed from front end 230 to a vertex shader 235. Vertex shader 235 executes vertex shader program instructions, performing texture fetches as needed to process vertex data and produce processed vertex data. Unnecessary texture fetches are dynamically cancelled prior to execution by vertes shader 235. Processed vertex data is passed from vertex shader 235 to a rasterizer 250. Rasterizer 250 is a sampling unit that processes primitives and generates sub-primitive data, such as fragment data, including parameters associated with fragments (texture identifiers, texture coordinates, and the like). Rasterizer 250 converts the primitives into sub-primitive data by performing scan conversion on the data processed by front end 230. Rasterizer 250 outputs fragment data and shader program instructions to fragment processing pipeline 260. The fragment data includes a coverage mask for each pixel group that indicates which pixels within the pixel group and/or sub-pixel positions within a pixel are covered by the fragment.

The shader programs configure the fragment processing pipeline 260 to process fragment data by specifying computations and computation precision. Fragment shader 255 is optionally configured by shader program instructions such that fragment data processing operations are performed in multiple passes within fragment shader 255. During processing the fragment shader 255 may modify the fragment (pixel or sub-pixel) coverage mask to "kill" fragments. Texture fetches are not performed for "killed" fragments. A writemask specifying which components are write enabled for a pixel can be included with each shader program instruction. For example, when four components are used, such as red, green, blue, and alpha, the writemask may enable writing one or more of the components. Unnecessary texture fetches are dynamically cancelled prior to execution by fragment shader 255. The textured fragments, with texels or without unnecessary texels, are processed using techniques known to those skilled in the art to produce shaded fragment data.

Fragment shader 255 outputs the shaded fragment data, e.g., color and depth, and codewords generated from shader program instructions to raster operations unit 265. Raster operations unit 265 includes a read interface and a write interface to memory management unit 220 through which raster operations unit 265 accesses data stored in local memory 240 or host memory 212. Raster operations unit 265 optionally performs near and far plane clipping and raster operations, such as stencil, z test, blending, and the like, using the fragment data and pixel data stored in local memory 240 or host memory 212 at a pixel position (image location specified by x,y coordinates) associated with the processed fragment data. The output data from raster operations unit 265 is written back to local memory 240 or host memory 212 at the pixel position associated with the output data and the results, e.g., image data are saved in graphics memory.

When processing is completed, an output 285 of graphics subsystem 270 is provided using output controller 280. Alternatively, host processor 214 reads the image stored in local memory 240 through memory management unit 220, interface 217 and system interface 215. Output controller 280 is optionally configured by opcodes to deliver data to a display device, network, electronic control system, other computing system 200, other graphics subsystem 270, or the like.

Figure 3A:
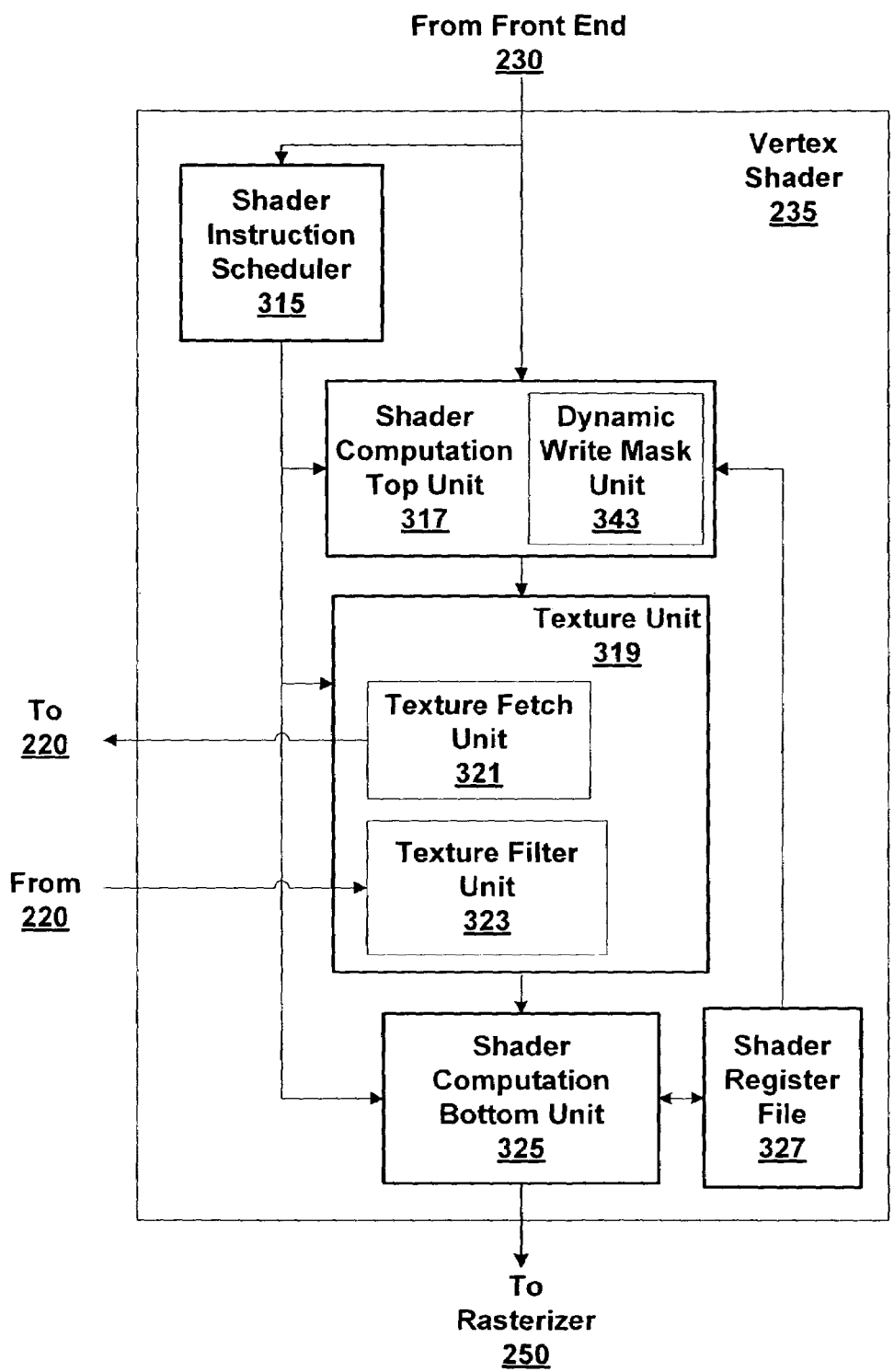
FIG. 3A is a block diagram of an exemplary embodiment of the vertex shader from FIG. 2 in accordance with one or more aspects of the present invention.

FIG. 3A is a block diagram of vertex shader 235 shown in FIG. 2 in accordance with one or more aspects of the present invention. A shader instruction scheduler 315 receives sequences of program instructions and schedules each program instruction for execution by a processing unit in a processing pipeline, such as a shader computation top unit 317, a texture unit 350 319, or a shader computation bottom unit 325. In some embodiments of the present invention, the optimized sequence of program instructions are read by shader instruction scheduler 315 from local memory 240 via memory management unit 220 or via memory management unit 220 and a cache (not shown).

Figure 4:
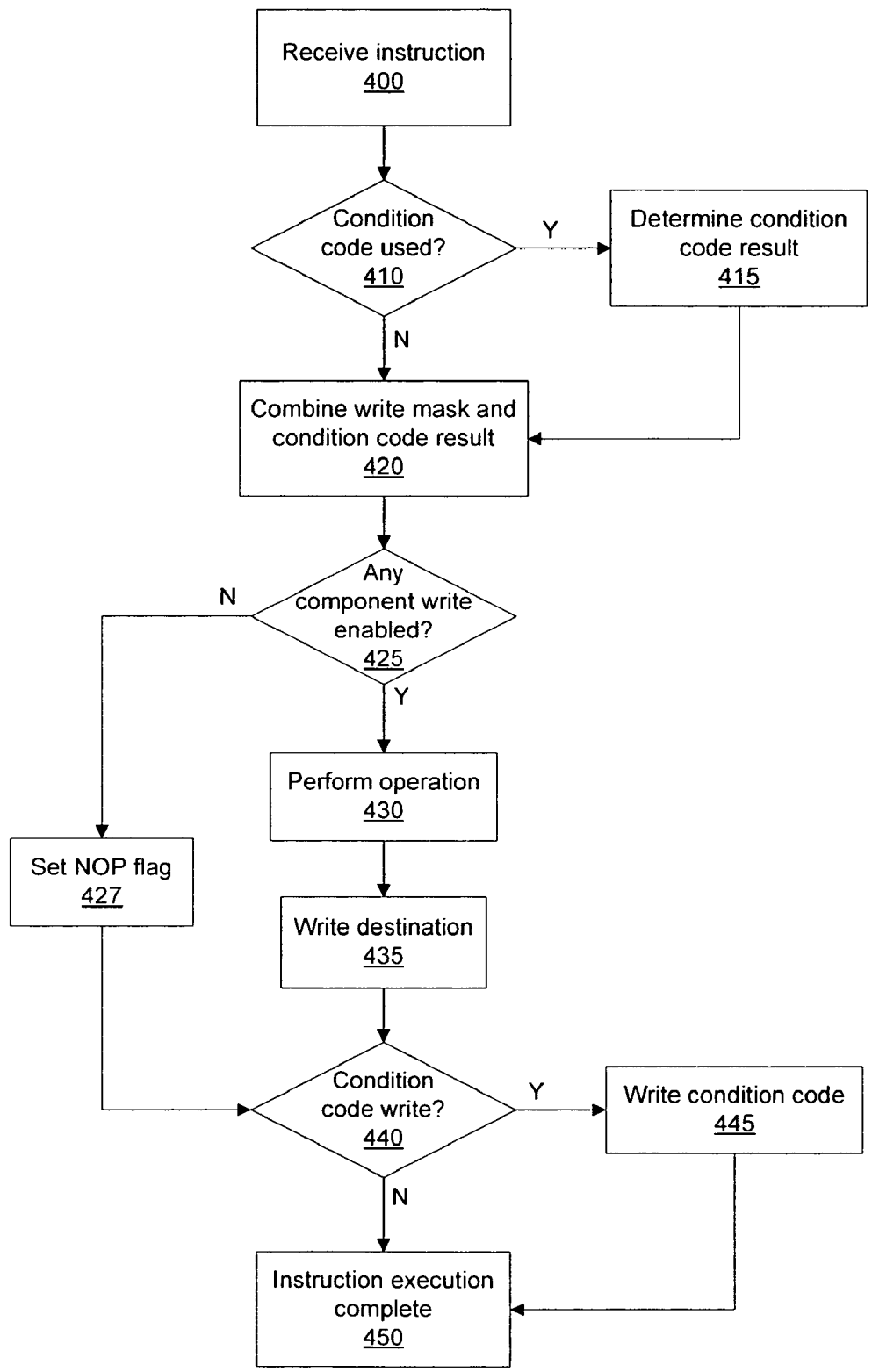
FIG. 4 illustrates an embodiment of a method for using condition codes to dynamically cancel texture fetches in accordance with one or more aspects of the present invention.

Shader computation top unit 315 performs operations requiring division and multiplication and dynamically cancels operations based on condition codes (condition code values and comparison operations), as described in conjunction with FIG. 4.

Texture unit 319 includes a texture fetch unit 321 and a texture filter unit 323. Texture fetch unit 321 computes texture map addresses and fetches texture data via memory management unit 220. Texture filter unit 323 receives the texture data and filters the texture data to produce filtered texture data. Shader computation bottom unit 325 receives filtered texture data and texture coordinates from texture unit 319 and produces shaded vertices. A shader register file 327 is a storage resource used to store temporary values needed during execution of the shader programs.

Each processing unit within vertex shader 235 is configured to execute specific program instructions. Shader instruction scheduler 315 schedules execution of each program instruction for execution by a processing unit that is configured to perform the operation(s) specified by the program instruction. Shader computation top unit 317 performs operations including swizzling, condition code generation and testing, clamping, multiplication and reciprocal operations. Shader computation top unit 317 includes a dynamic writemask unit 343 that is configured to dynamically cancel texture fetches, as described in conjunction with FIG. 4. In some embodiments of the present invention, dynamic writemask unit 343 also cancels other unnecessary operations.

Texture unit 319 may be configured to perform operations including derivative calculations, texture addressing, and interpolation. Shader computation bottom unit 325 may be configured to perform operations including addition, cosine, sine, dot product, logarithm, and multiplication. In other embodiments of the present invention, additional processing units may be included in vertex shader 235.

In some embodiments, texture fetch unit 321 receives data, e.g., program instructions, and attributes associated with vertices, from front end 230. Texture fetch unit 321 uses the texture coordinates to compute a LOD for mip-mapped textures and texture map addresses and generates texture read requests to fetch texels. Texture filter unit 323 receives the fetched texture data and filters the texture data to produce a filtered texel for each fragment. Filtered texels are output to shader computation bottom unit 325 for further processing.

Because a texture fetch is expensive in terms of latency and memory bandwidth, only necessary texture fetches should be performed to maximize texture processing performance. Dynamically canceling unnecessary texture fetches may improve texture performance by reducing the number of clock cycles texture unit 319 stalls while waiting for texture data to be received by texture filter unit 323. Furthermore, dynamically canceling unnecessary texture fetches may reduce the number of texture read requests output by graphics processor 205 to local memory 240, freeing up bandwidth and possibly reducing power requirements for interfaces of memory management unit 220 and graphics interface 217.

Figure 3B:
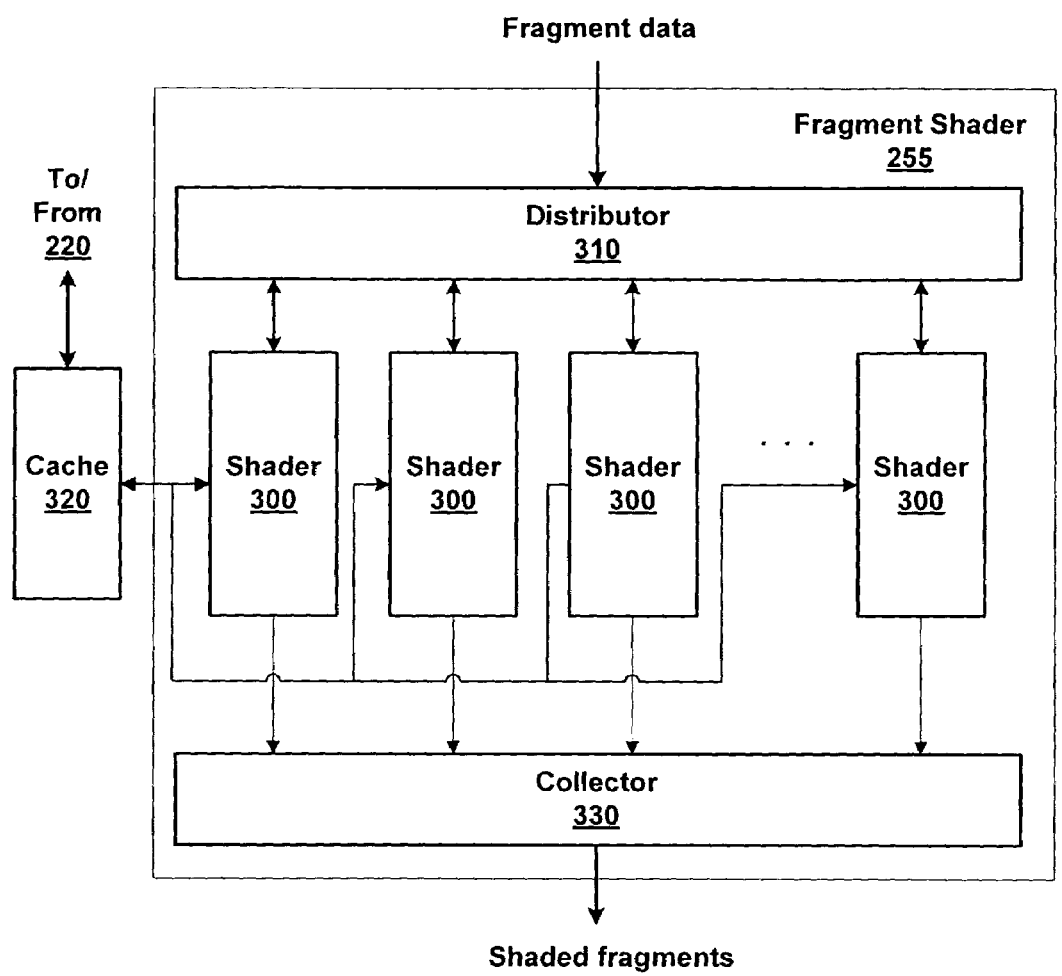
FIG. 3B is a block diagram of an exemplary embodiment of the fragment shader from FIG. 2 in accordance with one or more aspects of the present invention.

FIG. 3B is a block diagram of fragment shader 255 shown in FIG. 2 in accordance with one or more aspects of the present invention. One or more shader 300 may be included within fragment shader 255. Each shader 300 is configured to receive shader program instructions and fragment data from a distributor 310. The shader program instructions may include instructions for which compiler 211 has inserted condition code writes and/or condition code comparison operations. The fragment data are processed according to the shader program instructions to produce shaded fragments. Each shader 300 includes an interface to a cache 320 for reading texture data. As previously described, shader 300 may be configured to dynamically cancel texture fetches. In some embodiments of the present invention, cache 320 is omitted and each shader 300 interfaces directly with memory management unit 220.

Texture data that is not available in cache 320 is read from graphics memory and may incur a significant latency, possibly reducing graphics processing performance. Therefore, canceling unnecessary texture fetches may not only reduce the bandwidth needed between graphics processor 205 and local memory 240 or host computer 210, canceling unnecessary texture fetches may also increase shader program instruction execution throughput.

Each shader 300 outputs shaded fragments to a collector 330. Collector 330 reorders the shaded fragments as needed and outputs the shaded fragments to raster operations unit 265 of FIG. 2.

Figure 3C:
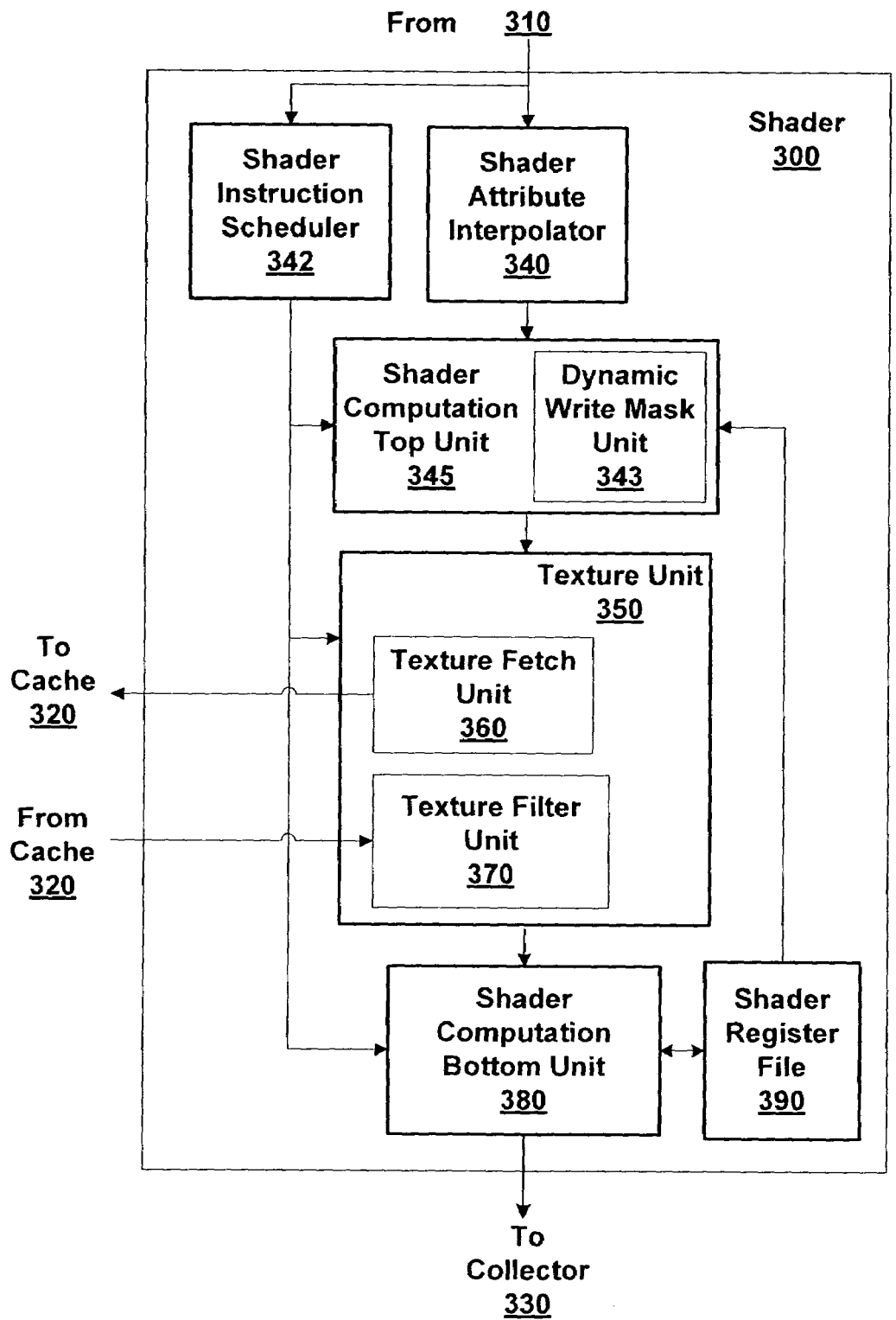
FIG. 3C is a block diagram of an exemplary embodiment of the shader from FIG. 3A in accordance with one or more aspects of the present invention.

FIG. 3C is a block diagram of an exemplary embodiment of shader 300 from FIG. 3B in accordance with one or more aspects of the present invention. Like shader instruction scheduler 315, a shader instruction scheduler 342 receives sequences of program instructions and schedules each program instruction for execution by a processing unit in a processing pipeline, such as a shader attribute interpolator 340, a shader computation top unit 345, a texture unit 350, or a shader computation bottom unit 380. In some embodiments of the present invention, the optimized sequence of program instructions are read by shader instruction scheduler 342 from local memory 240 via memory management unit 220 or via memory management unit 220 and cache 320.

Shader attribute interpolator 340 produces interpolated attributes, such as texture coordinates, barycentric coefficients, depth (z or w), or the like, that may be sourced by the other processing units within shader 300. Shader computation top unit 345 performs perspective correction of the interpolated attributes and other operations requiring division and multiplication and dynamically cancels operations based on condition codes (condition code values and comparison operations), as described in conjunction with FIG. 4.

Texture unit 350 is similar to texture unit 319 and includes a texture fetch unit 360 and a texture filter unit 370. Texture fetch unit 360 computes texture map addresses and fetches texture data via memory management unit 220 and cache 320. In some embodiments of the present invention, cache 320 is omitted and texture unit 350 interfaces directly with memory management unit 220. Texture filter unit 370 receives the texture data and filters the texture data to produce filtered texture data. Shader computation bottom unit 380 receives filtered texture data and interpolated attributes from texture unit 350 and produces shaded fragments. A shader register file 390 is a storage resource used to store temporary values needed during execution of the shader programs.

Each processing unit within shader 300 is configured to execute specific program instructions. Shader instruction scheduler 342 schedules execution of each program instruction for execution by a processing unit that is configured to perform the operation(s) specified by the program instruction. For example, shader attribute interpolator 340 may be configured to perform operations including computing sums of products to produce interpolated attributes. Shader computation top unit 345 performs perspective correction of interpolated attributes, including swizzling, condition code generation and testing, clamping, multiplication and reciprocal operations. Shader computation top unit 345 includes a dynamic writemask unit 343 that is configured to dynamically cancel texture fetches), as described in conjunction with FIG. 4. In some embodiments of the present invention, dynamic writemask unit 343 also cancels other unnecessary operations.

Texture unit 350 may be configured to perform operations including derivative calculations, texture addressing, and interpolation. Shader computation bottom unit 380 may be configured to perform operations including addition, cosine, sine, dot product, logarithm, and multiplication. In other embodiments of the present invention, additional processing units may be included in shader 300.

In some embodiments, texture fetch unit 360 receives data, e.g., program instructions, and attributes associated with fragments (coverage information, texture identifiers, texture coordinates such as s, t, and r, and the like) from a rasterizer, such as rasterizer 250. Texture fetch unit 360 uses the texture coordinates to compute a LOD for mip-mapped textures and texture map addresses and generates texture read requests to fetch texels from cache 320. Texture filter unit 370 receives the fetched texture data and filters the texture data to produce a filtered texel for each fragment. Filtered texels are output to shader computation bottom unit 380 for further processing.

Because a texture fetch is expensive in terms of latency and memory bandwidth, only necessary texture fetches should be performed to maximize texture processing performance. Dynamically canceling unnecessary texture fetches may improve texture performance by reducing the number of clock cycles texture unit 350 stalls while waiting for texture data to be received by texture filter unit 370. Furthermore, dynamically canceling unnecessary texture fetches may reduce the number of texture read requests output by graphics processor 205 to local memory 240, freeing up bandwidth and possibly reducing power requirements for interfaces of memory management unit 220 and graphics interface 217.

Figure 3D:
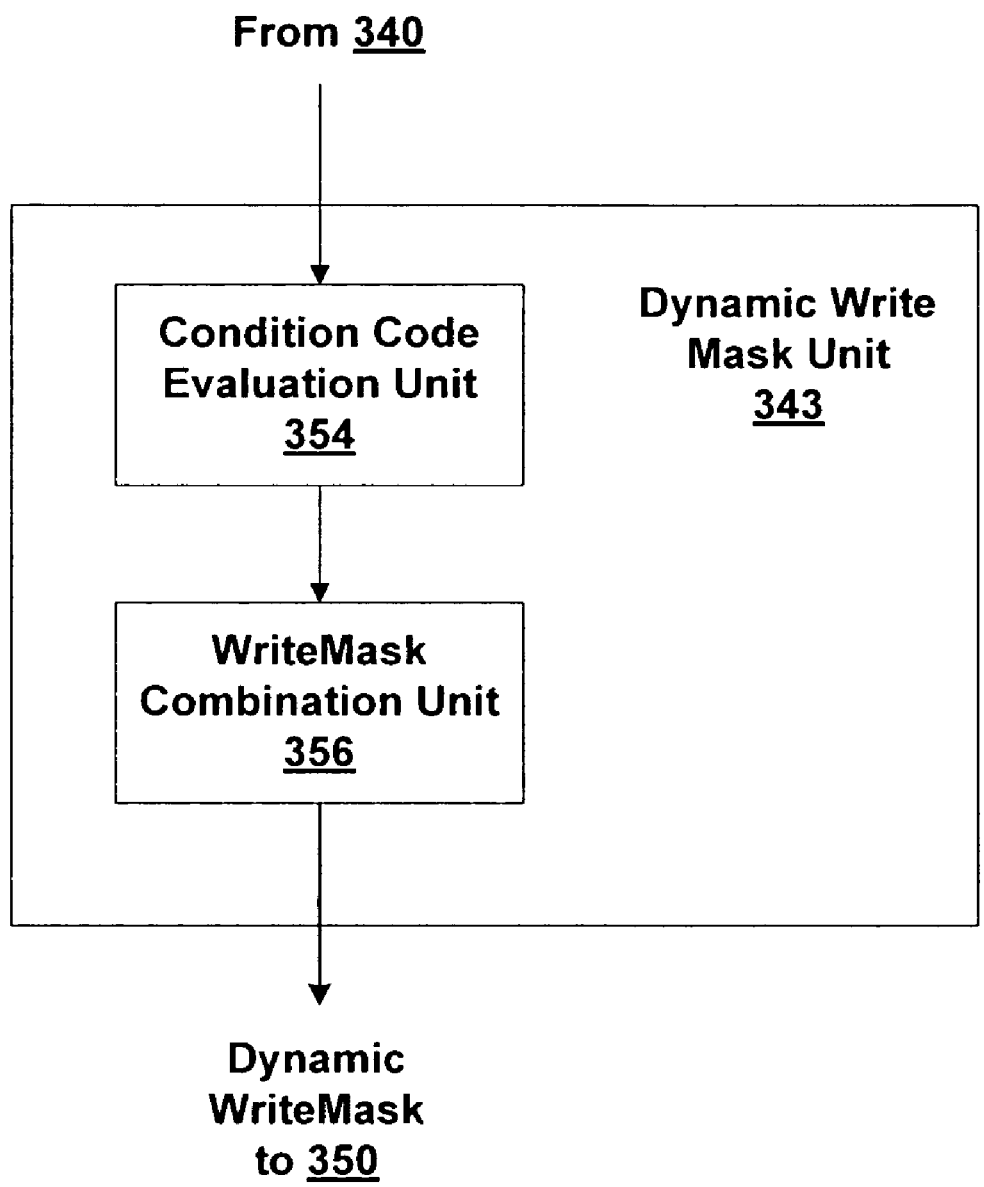
FIG. 3D is a block diagram of an exemplary embodiment of the dynamic writemask unit from FIG. 3C in accordance with one or more aspects of the present invention.

FIG. 3D is a block diagram of an exemplary embodiment of dynamic write mask unit 343 from FIGS. 3A and 3C in accordance with one or more aspects of the present invention. Dynamic write mask unit 343 includes a condition code evaluation unit 354 and a writemask combination unit 356. Dynamic write mask unit 343 receives a writemask specified by a shader program instruction and produces a dynamic write mask based on the writemask, condition code operations, and condition code values. The writemask indicates which components are write enabled for the fragment or vertex being processed. For example, a move instruction, MOV R1.yz, R0.xyzw; specifies that only the y and z components of R1 will be written. The second component of R0, y, is written to the y component of R1 and the third component of R0, z, is written to the z component of R1. The x and w components of R1 are unchanged. The writemask enabled components may then be effectively disabled by writemask combination unit 356 for a shader program instruction based on the condition code result produced by condition code evaluation unit 354. Like, writemask, the condition code result is also a per-component mask. When all of the components are disabled for a shader program instruction, such as a texture fetch operation, the shader program instruction is converted into a NOP (no operation) operation for the fragment.

In some embodiments of the present invention the shader program instructions can re-arrange, i.e., swizzle, the components for an operand. For example, when an operand is specified as R0, the components are ordered as R0.xyzw. The components may be arbitrarily swizzled by specifying the operand as R0.zzwx, so that the z component is moved into the x and the y fields, the w component is moved into the z field, and the x component is moved into the w field. A component may be "smeared" by specifying only a single component for an operand. For example, R0.y is interpreted as R0.yyyy.

Condition code evaluation unit 354 evaluates the condition comparison operation specified by an instruction using the condition code values for a shader program to process the fragment corresponding to the pixel or to process the vertex corresponding to a graphics primitive. Condition code evaluation unit 354 outputs the condition code result to writemask combination unit 356. Writemask combination unit 356 combines the writemask with the condition code result to produce a dynamic writemask, as described in conjunction with FIG. 4. The dynamic writemask disables texture fetches that are not necessary and it is output to texture unit 350. In some embodiments of the present invention, when the dynamic writemask indicates that the fragment does not contribute to any component of a pixel, the "kill" flag is set for the pixel.

FIG. 4 illustrates an embodiment of a method for using condition codes to dynamically cancel texture fetches in accordance with one or more aspects of the present invention. In step 400 condition code evaluation unit 354 receives any comparison operation specified by a shader program instruction and condition code values. The condition code values, one per component, for the shader program are stored in a condition code register (not shown) within condition code evaluation unit 354. Possible values are GT (greater than zero), EQ (equal to zero), LT (less than zero), or UN (unordered, indicating non a number). The register is initialized to EQ for each component when the shader program starts. The comparison operation is applied to the condition code values to produce a condition code result for the fragment or vertex.

In step 410, condition code evaluation unit 354 determines if a comparison operation should be applied for the shader program instruction. Possible comparison operations include true (TR), false (FL), greater (GT), greater or equal (GE), less (LT), less or equal (LE), equal (EQ), and not equal (NE). A comparison operation may be specified for any shader program instruction. For example, a move instruction without a comparison operation, MOV R2.xyz, R0; may be changed to MOV R1.xw(GE), R0.xyzw, specifying the greater than or equal comparison operation. Note that the writemask for the operation specifies that only the x and w components will be written to R1.

If, in step 410 condition code evaluation unit 354 determines that a comparison operation should be applied for the shader program instruction then, in step 415 condition code evaluation unit 354 determines the condition code result (per-component mask) for the fragment or the vertex. As previously described, condition code value indicates the result of a comparison with zero. Condition code values are initialized as equal (equal to zero) and may be written by any shader program instruction, as described in conjunction with step 445.

Table 1 below summarizes the application of the comparison operator to a condition code result for a component of a fragment. Table 1 is indexed by the comparison operator and the condition code value for a component, and yields the condition code result for the component. A comparison operation of False produces a condition code result of false, regardless of the condition code value. Likewise, a comparison operation of True produces a condition code result of true, regardless of the condition code value.

TABLE 1

| | Condition code value | | | |
| --- | --- | --- | --- | --- |
| Comparison operation | Equal | Greater than | Less than | Unordered |
| False | False | False | False | False |
| Less than | False | False | True | False |
| Equal | True | False | False | False |
| Less than or Equal | True | False | True | False |
| Greater than | False | True | False | False |
| Not equal | False | True | True | True |

TABLE 1-continued

| | Condition code value | | | |
|---|---|---|---|---|
| Comparison operation | Equal | Greater than | Less than | Unordered |
| Greater than or Equal | True | True | False | False |
| True | True | True | True | True |

In some embodiments of the present invention, the condition code values can be swizzled before applying the comparison operator. For example, the condition code values for the GE comparison operation are swizzled from xyzw to wxxx in a move instruction: MOV R1.xw(GE.wxxx), R0.xyzw.

For example, when the condition code values stored in the condition code register are GT,LT,EQ,EQ and are swizzled from xyzw to wxxx to produce EQ,GT,GT,GT. Therefore, the condition code values for the y and z components are not used for the comparison operation. The x component of R1 is written with the x component of R0 based on the condition code result of the w condition code value and the "greater than or equal" comparison operator. The w component of R1 is written with the w component of R0 based on the condition code result of the x condition code value and the "greater than or equal" comparison operator. Condition code values may also be smeared.

Comparison operations may be applied for any shader program instruction. For example, a multiply instruction may use a w component condition code: MUL R3.x(GT.w), R0, R1. R3.x is written with T0.x*R1.x if the w component condition code value is "greater than" zero. In some embodiments of the present invention, the product has not been computed and the multiply operation and the write of the R3 register are both dynamically cancelled. In other embodiments of the present invention, the product is computed prior to evaluation of the condition code result and only the write of the R3 register is dynamically cancelled.

In another example, a texture fetch instruction may use a temporary variable, tmp, as a condition code value: TEX tmp(NE), fragment.texcoord[0], TEX0.2D. The texture fetch is performed only if the condition code value for tmp is "not equal to zero." Specifically, when the condition code value is GT, LT, or NE, the condition code result is True and writing is enabled. Likewise, when the condition code value is GE, LE, or EQ, the condition code result is False and writing is disabled. Furthermore, the texture address is not computed when the comparison operation produces a condition code result of zero.

If, in step 410 condition code evaluation unit 354 determines that a comparison operation should not be applied for the shader program instruction, and the method proceeds to step 420. Alternatively, in step 410 the default condition code of True is used for the shader program instruction when a comparison operation should not be applied and the method proceeds to step 420.

In step 420 writemask combination unit 356 combines the writemask specified by the shader program instruction with the condition code result (true or false for each component of the pixel) provided by condition code evaluation unit 354. The dynamic writemask for each component is the logical "AND" of the writemask and the condition code result.

The code shown in Table 2 may be used to perform the functions of steps 415, 420, 425, and 427. As previously explained, when a comparison operation is not specified the True comparison operation may be used to perform step 415.

By way of illustration, the code is defined using C++. However, other languages may be used to define the function.

TABLE 2

```
// calculate the dynamic write mask for this instruction
for (int k = 0; k < 4; k++)
    calcwmask[k] = wrMask[k] &&ccoper[compare][cc[swiz[k]]];
if ((calcwmask[0] &calcwmask[1] &calcwmask[2] &calcwmask[3]) ==
0)
    // set nop bit for this instruction
    st.pixel[pixel].nop = r.pixel[pixel].nop = ToU001(1);
``` calcwmask is a temporary variable, boolean with k components, representing the dynamic writemask for each of the components. cc is the condition code value for a component (2 bits). wrMask is the writemask specified by the shader program instruction. compare is the comparison operation, specified by the shader program instruction and ccoper is a lookup table corresponding to Table 1. swiz is the condition code value swizzle specified by the shader program instruction. st.pixel[pixel].nop and r.pixel[pixel].nop are the texture NOP flags. In other embodiments of the present invention nop flags may be asserted for other shader program instructions.

In step 425 writemask combination unit 356 determines if writes are enabled by the dynamic writemask for any of the components, and if not, in step 427 the NOP flag is set for the shader program instruction. If, in step 425 writemask combination unit 356 determines that writes are enabled by the dynamic writemask for one or more of the components, then in step 430 the operands specified by the shader program instruction are processed, and in step 435 the enabled components in the destination register are written with the result of the processed operands. The operands may be processed by shader computation bottom unit 380, shader register file 390, texture unit 350, or shader computation top unit 345 (in another pass) to complete execution of the shader program instruction and store the result in the destination specified by the shader program instruction.

In step 440 writemask combination unit 356 determines if the shader program instruction specifies that one or more condition code values should be written, and, if so, in step 445 the one or more condition code values are written. The condition code values may be written using a variation of a shader program instruction, e.g., MOVC instead of MOV. For example, the x and w condition code values may be updated based on execution of an addition instruction: ADDC R1.xw, R0.yyyz, R0.x, where the components of each addend (R0) are swizzled. The value written to R1.x is R0.y+R0.x (the sum of the x field of R0.yyyz and the x field of R0.x). The value written to R1.w is R0.z+R0.x (the sum of the w field of R0.yyyz and the w field of R0.x). The x and w component condition code values are updated based on the computed result for the instruction, R0.y+R0.x and R0.z+R0.x, respectively.

A significant advantage of the present invention is that a condition code value may be both applied and written by execution of any single shader program instruction. Therefore, the condition code values from the nth shader program instruction must be available for use by the (n+1)th shader program instruction, requiring the condition code values to be pipelined from one instruction to the next instruction immediately. In conventional systems the condition code values are not usually available until the destination is written, i.e., stored in shader register file 390, which may be one or more clock cycles after the shader program instruction is executed.

For example, a multiply program instruction may apply and write the condition code values: MULC R3.x(GT.w), R0, R1. R3.x is written with R0.x*R1.x when the w component condition code value is GT (greater than). The x component condition code value is also updated when the w component condition code value is GT. When the w component condition code value is GT, the x component condition code is the result of comparing the processed result for the x component, R0.x*R1.x, to zero. Consequently, applying and writing the condition code values is possible in a single shader program instruction, permitting condition code updates to be cascaded in a sequence of shader program instructions. For example, the sequence of shader program instructions shown in Table 3 cascades condition code updates while also applying the condition codes.

TABLE 3

MULC result, A, B;
TEXC tmp(NE), fragment.texcoord[0], TEX0.2D;
MULC result(NE), result, tmp;
TEXC tmp(NE), fragment.texcoord[1], TEX1.2D;
MUL result, result, tmp;

The first four shader program instructions shown in Table 3 each write condition code values, sometimes dependent on a comparison operation result. The second, third, and fourth shader program instructions each apply comparison operations to condition code values to produce condition code results. If execution of any prior program instruction results in all components being equal to zero, i.e. the dynamic writemask is zero and the NOP flag is set. Therefore, one or more of the texture fetches specified by the TEXC shader program instruction may be cancelled.

If in step 440 writemask combination unit 356 determines that the shader program instruction does not specify that one or more condition code values should be written, then writemask combination unit 356 proceeds to step 450. In step 450 the shader program instruction execution is complete and dynamic write mask unit 343 may proceed to process another shader program instruction. Dynamic mask unit 343 outputs the destination value, condition code values, dynamic writemask, and/or the NOP flag to texture unit 350.

As previously mentioned in conjunction with FIG. 1, shader program instructions may be used to compute products or sums of products, such as A*Tex0*Tex1+B*C*Tex2*Tex3. When one of the multiplicands is zero texture fetches do not need to be performed to compute one of the products. Likewise, program instructions used to compute one or more of the variables, A, B, and C do not need to be performed when they will be multiplied by a texture fetch that is zero. The comparison operator and condition code values may be used to determine a dynamic writemask and cancel execution of unnecessary program instructions.

Specific examples of situations when one or more of the terms used in a shading computation may be zero include attenuation of textures for light fall-off, when the specular falloff is zero (except for a small region coincident with the direction of light reflection), when diffuse lighting is clamped to zero because the surface normal is facing the opposite direction from the incoming light, when a "gloss map" texture is used that is zero except in shiny regions of a surface, or the like. In particular, when an object, such as a sphere faces away from the light the dot product of the surface normal and the light vector is non-positive and any corresponding texture fetches can be cancelled. Dynamic cancellation of operations may also be used to implement if-then-else constructs. For example, an "if condition" can be expressed using a comparison operator and condition code values.

FIG. 5 illustrates an embodiment of a method for revising a shader program to dynamically cancel texture fetches during execution in accordance with one or more aspects of the present invention. In step 500 compiler 211 parses the shader program into an abstract representation. In step 505 compiler 211 determines if the abstract representation includes a cancelable instruction. A program instruction is cancelable if it "may be" unnecessary, i.e. if executing the instruction will not affect the final shaded fragment value. Whether or not the cancelable instruction "is" unnecessary cannot be determined until the shader program is executed. For example, a multiply with a multiplicand of zero, a texture fetch that is multiplied by zero, if-then-else branching constructs, and the like.

If, in step 505, compiler 211 determines that the abstract representation includes a cancelable instruction, then in step 510 compiler 211 modifies the cancelable operation to include a comparison operation based on condition code values. For example, a texture fetch instruction is changed from TEX tmp, fragment.texcoord[0], TEX0.2D to TEX tmp(NE), fragment.texcoord[0], TEX0.2D. In another example a MOV instruction is changed from MOV R1, R0 to MOV R1(GT), R0. A multiply instruction is changed from MUL R3, R0, R1 to MUL R3(GT.w), R0, R1. Compiler 211 then returns to step 505 and determines if the abstract representation includes another cancelable instruction.

If, in step 505 compiler 211 determines that the abstract representation does not include a cancelable operation, then compiler 211 proceeds to step 520. In step 520 driver 213 translates the revised shader program produced by compiler 211 for execution by graphics processor 205 and dynamic write mask unit 343 dynamically cancels unnecessary operations.

In some embodiments of the present invention, driver 213 modifies the texture instructions to configure fragment shader 255, thereby enabling or disabling uncovered texture fetches for each texture instruction. The texture instructions may be modified to set a single bit enabling uncovered texture fetching. In those embodiments of the present invention, texture fetch unit 360 generates texel read requests for texels of uncovered pixels only when the texture instruction indicates that uncovered texture fetching is enabled. In some embodiments of the present invention the steps described in conjunction with FIG. 5 are performed by a shader program author. Persons skilled in the art will appreciate that any system configured to perform the method steps of FIG. 4 or 5 or their equivalents, is within the scope of the present invention.

Because a texture fetch is expensive in terms of latency and memory bandwidth, only necessary texture fetches should be performed to maximize texture processing performance and graphics processing throughput. Similarly, other operations, such as multiplication should be canceled when their execution does not affect the final result. Avoiding unnecessary texture fetches may improve texture performance by reducing the number of clock cycles spent waiting for unnecessary texture data to be fetched. Furthermore, avoiding unnecessary texture fetches may reduce the number of texture read requests, freeing up bandwidth between graphics memory and graphics processor 205. Reducing memory bandwidth and computations also reduces power requirements for external interfaces and the graphics logic, respectively. Avoiding unnecessary operations may also enable processing units within shader 300 to be reallocated to process data to perform other operations rather than perform operations that won't contribute to the final value of a pixel.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A computer-implemented method of dynamically canceling execution of an unnecessary operation specified by a program instruction during execution of the program instruction, comprising:
   determining that a condition code comparison operation is specified by the program instruction;
   obtaining condition code values for data being processed by the program instruction;
   applying the condition code comparison operation to the condition code values to produce a condition code result;
   combining the condition code result with a writemask to produce a dynamic writemask indicating determine whether or not an operation specified by the program instruction is unnecessary and should be canceled;
   determining that a first condition code value should be updated;
   generating a new condition code value based on the condition code result;
   updating the first condition code value with the new condition code value, wherein the new condition code value may be used to determine whether an operation specified by a subsequent program instruction should be canceled; and
   storing the new condition code value in a memory.

2. The method of claim 1, wherein the operation specified by the program instruction is canceled when an AND operation performed with the condition code results and the writemask does not result in a logical "true" value.

3. The method of claim 1, wherein the operation specified by the program instruction is a texture fetch.

4. The method of claim 1, where the data is for a fragment corresponding to a pixel.

5. The method of claim 1 where the data is for a vertex corresponding to a graphics primitive.

6. The method of claim 1, wherein combining the condition code result with the writemask determines whether the result of the program instruction is written after the program instruction is executed.

7. A computer-readable storage medium, excluding a signal bearing medium, containing a program which, when executed by a computing device, performs a process for inserting condition code comparison operations and condition code writes to produce a revised shader program, the process comprising:
   determining that an operation specified by a program instruction is cancelable;
   modifying the program instruction to specify a condition code comparison operation to be applied to condition code values to produce condition code results during execution of the program instruction, wherein the condition code results are used to determine whether or not the operation specified by the program instruction should be dynamically cancelled during execution of the revised shader program;
   modifying the program instruction to specify computing a new condition code value using the condition code results, and updating the condition code value with the new condition code value, wherein the new condition code value is used to determine whether an operation specified by a subsequent program instruction should be canceled.

8. The computer-readable storage medium of claim 7, wherein the operation specified by the program instruction is cancelable if the program instruction specifies an arithmetic operation.

9. The computer-readable storage medium of claim 7, wherein the operation specified by the program instruction is cancelable if the program instruction specifies a texture fetch operation.

10. The computer-readable storage medium of claim 7, wherein the condition code comparison operation is inserted to dynamically cancel execution of the operation specified by the program instruction when an operand of the program instruction is a non-positive dot product of two vectors.

11. The computer-readable storage medium of claim 7, wherein combining the condition code result with the writemask determines whether the result of the program instruction is written after the program instruction is executed.

12. A computing device, comprising:
   a memory;
   a processor configured to execute a program and dynamically cancel unnecessary operations and update condition code values during execution of the program, wherein the processor includes a dynamic writemask unit configured to determine whether or not an operation specified by a program instruction should be dynamically canceled based on a condition code result that is produced by applying a condition code comparison operation specified by the program instruction to condition code values of a vertex or a fragment being processed by the program instruction, and is configured to update a first condition code value with a new condition code value that is generated based on the condition code result, wherein the new condition code value is used to determine whether an operation specified by a subsequent program instruction should be canceled.

13. The computing device of claim 12, further comprising a compiler configured to revise the program instruction to specify the condition code comparison operation and the condition code value update.

14. The computing device of claim 12, wherein the dynamic writemask unit is configured to cancel the operation specified by the program instruction when an AND operation performed with the condition code results and the writemask does not result in a logical "true" value.

15. The computing device of claim 12, wherein the operation specified by the program instruction is a texture fetch.

16. The computing device of claim 12, wherein combining the condition code result with the writemask determines whether the result of the program instruction is written after the program instruction is executed.

* * * * *